United States Patent [19]

Okamoto et al.

[11] Patent Number: 4,885,787

[45] Date of Patent: Dec. 5, 1989

[54] HIGH-SPEED DIGITAL IMAGE PROCESSING APPARATUS

[75] Inventors: Kenji Okamoto; Yasushi Kida, both of Osaka, Japan

[73] Assignee: Sumitomo Electric Industries, Ltd., Osaka, Japan

[21] Appl. No.: 157,709

[22] Filed: Feb. 19, 1988

[30] Foreign Application Priority Data

Feb. 20, 1987 [JP] Japan .................................. 62-38765

[51] Int. Cl.$^4$ .............................................. G06K 9/40
[52] U.S. Cl. ..................................... 382/54; 333/165; 333/166; 358/166; 358/167; 364/724.19
[58] Field of Search .................... 382/54, 27; 358/166, 358/167; 333/165, 166; 364/724.19

[56] References Cited

U.S. PATENT DOCUMENTS

| | | | |
|---|---|---|---|
| 4,012,628 | 3/1977 | Gersho | 235/156 |
| 4,593,378 | 6/1986 | McWhirter et al. | 382/34 |
| 4,623,923 | 11/1986 | Orbach | 358/166 |
| 4,700,345 | 10/1987 | Morcom et al. | 370/118 |
| 4,740,833 | 4/1988 | Shiota et al. | 358/80 |
| 4,785,411 | 11/1988 | Thompson et al. | 364/724.19 |
| 4,805,129 | 2/1989 | David | 382/54 |

Primary Examiner—David K. Moore
Assistant Examiner—Yon Jung
Attorney, Agent, or Firm—W. G. Fasse; D. H. Kane, Jr.

[57] ABSTRACT

An image processing apparatus is provided which is capable of real time image processing, especially filtering, without generating a delay in a frame memory. A cascade filtering circuit filters digital video signals obtained by digitally converting analog video signals to obtain a time sequential digital pixel data stream for the filtering operation based on a pattern of predetermined constants of a p-rows, q-columns. The cascade filtering circuit uses p basic filter circuits (100) cascade-connected with each other. Each basic filter circuit carries out the filtering for one-row and q columns of pixel data. Each basic filter circuit (100) includes delay circuits (40, 41, 42), multipliers (20, 21, 22), and adders (30, 31, 32). Interlace type digital video signals are converted into a noninterlace type pixel data stream by a structure wherein two frame memories (85a and 85b) are alternately switched in accordance with a frame period and the pixel data are written in every other lines in one frame memory while the pixel data are read-out in a noninterlace manner from the other frame memory and vice versa.

3 Claims, 12 Drawing Sheets

FIG. 3A   PRIOR ART
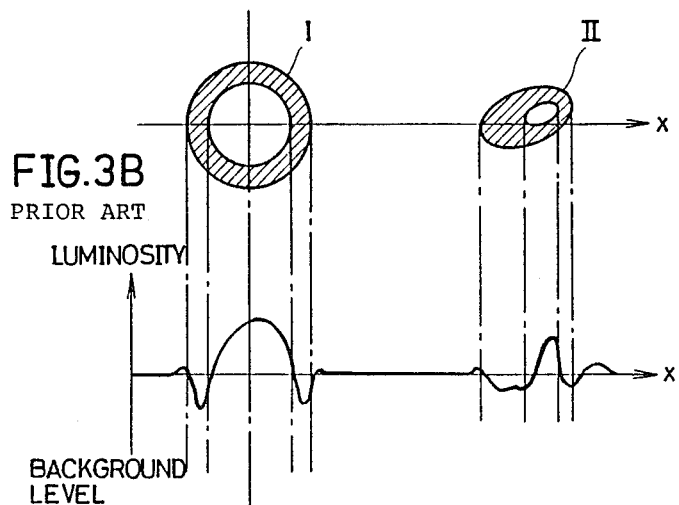
FIG. 3B
PRIOR ART
LUMINOSITY
BACKGROUND
LEVEL
FIG. 3C   PRIOR ART
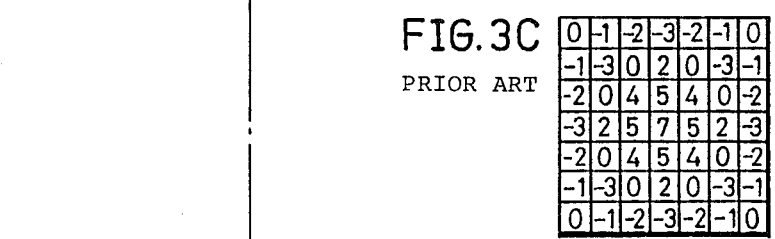
FIG. 3D   PRIOR ART
LUMINOSITY
THRESHOLD
VALUE
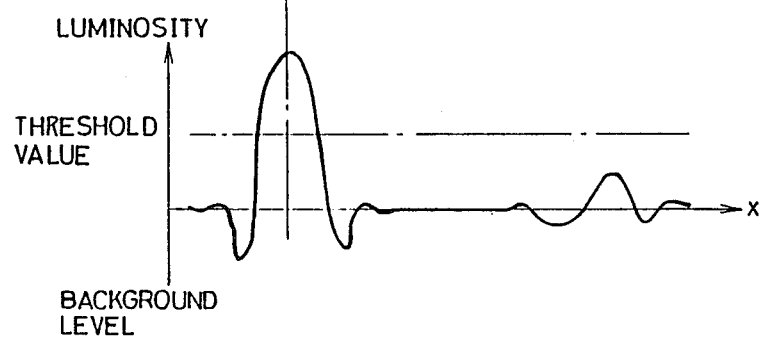
BACKGROUND
LEVEL

FIG.8A

| $a_1$ | $a_2$ | $a_3$ | | | | $a_m$ |
|---|---|---|---|---|---|---|
| $a_{m+1}$ | $a_{m+2}$ | | | | | $a_{2m}$ |
| $a_{2m+1}$ | $a_{2m+2}$ | | | | | $a_{3m}$ |
| | | | | | | |
| | | | | | | |
| | | | | | | |
| | | | | | | $a_{mm}$ |

FIG.8B

| $F_1$ | $F_2$ | $F_3$ |
|---|---|---|
| $F_4$ | $F_5$ | $F_6$ |
| $F_7$ | $F_8$ | $F_9$ |

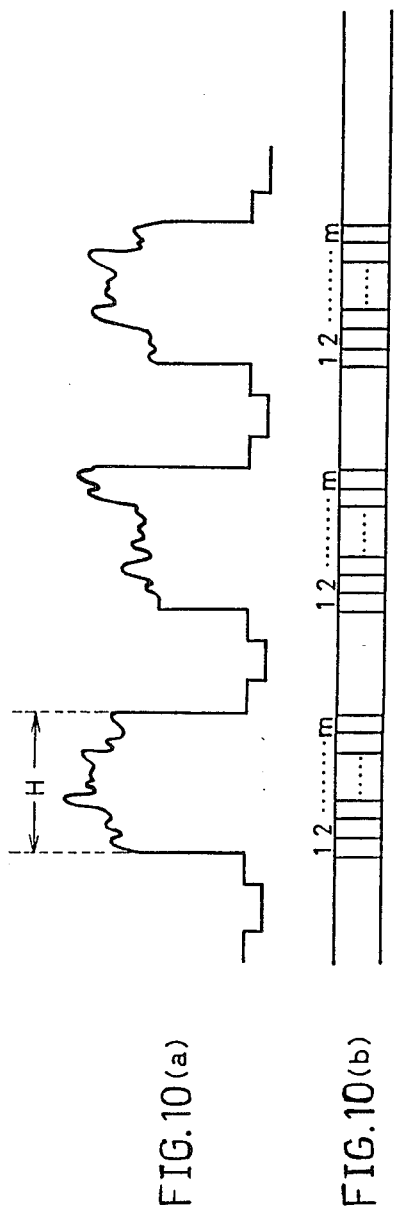
FIG.10(a)
FIG.10(b)
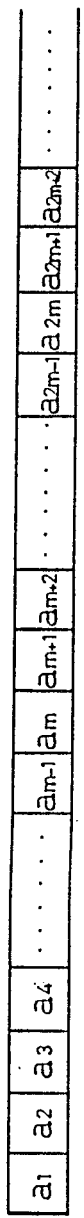
FIG.11

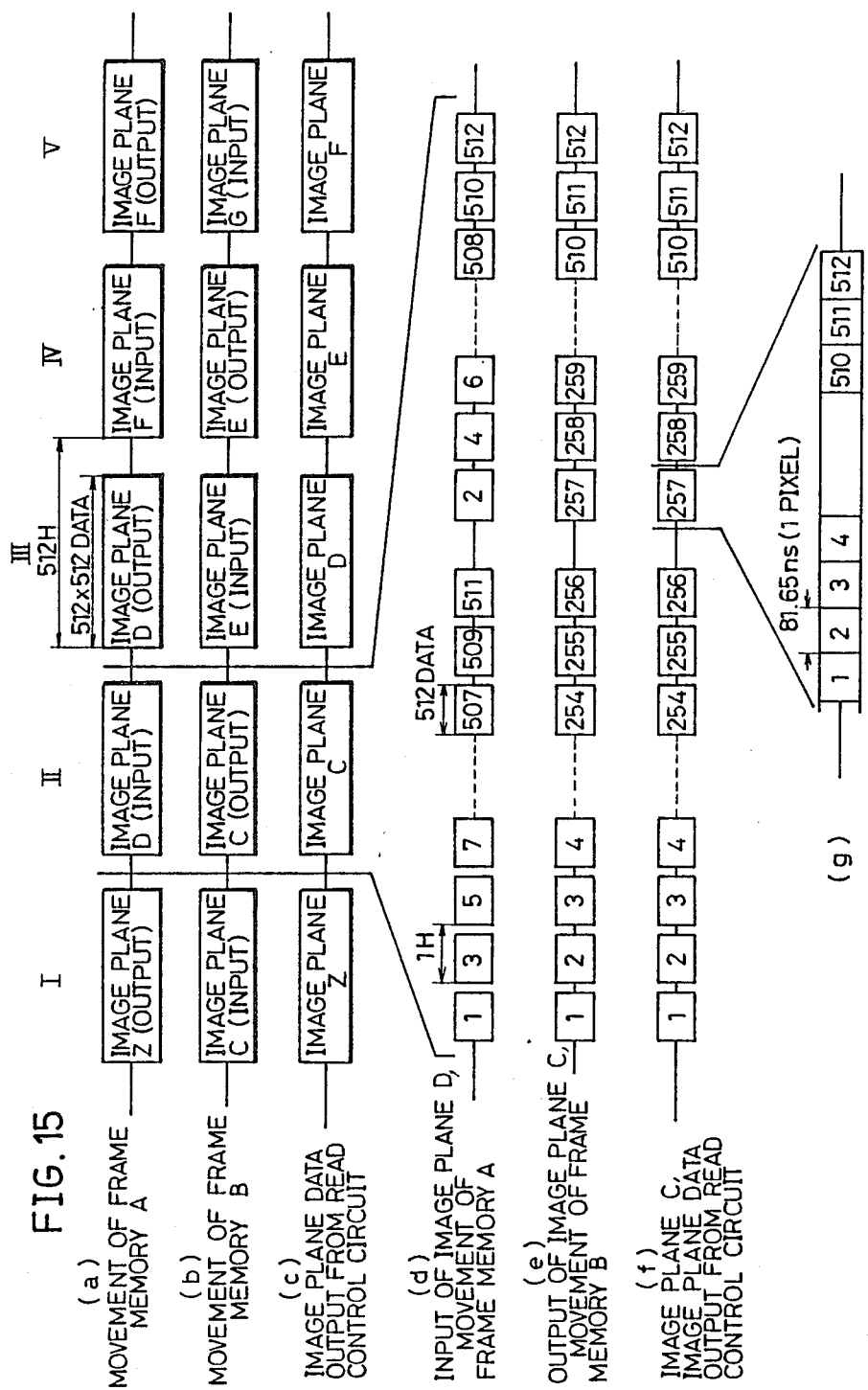

HIGH-SPEED DIGITAL IMAGE PROCESSING APPARATUS

BACKGROUND OF THE INVENTION

1. Field of the Invention

The present invention relates to an image processing apparatus and, more specifically, it relates to a structure of a digital image processing apapratus in which video signals from a television camera and the like are filtered in real time using eigher the interlace type of the noninterlace type filtering.

2. BACKGROUND INFORMATION

In the field of image processing, a process called filtering is often used. The filtering is employed to extract a shape having a specific characteristic in an image plane, or for extracting a boundary portion where the brightness in the image plane changes sharply. In the following, the filtering process will be described with reference to the matched filter method as a representative example.

The "matched filter method" is widely used in the field of image processing for extracting object regions having a specified intensity distribution and shape which are found here and there in the image plane (or a screen).

In the following, a general process of digital image processing will be described with reference to FIGS. 1A to 1C.

First, an enlarged image of an object to be measured such as erythhrocytes or metal surface grains, is obtained from a television camera through a microscope (FIG. 1A). Image processing is applied to these examples of measurements mainly for the purpose of counting the number of the grains or the like. The troublesome task of counting the grain number has conventionally been done by a skilled operator. However, with the development of the image processing technique, it became possible to automate the task. The processing is carried out in the following manner. First, the analog video signal obtained from a television camera is converted into digital signals using an AD (analogue-digital) converter. This step corresponds to the process of dividing the image plane into, for example, 256×256 sections or so-called pixels as shwon in FIG. 1B and allocating the intensity value of the image signals to each of the pixels as a digital data. In this step, the more finely the image is segmented, i.e., the larger the number of the pixels is, the higher the resolution of the image becomes. Generally, the pixel number corresponds to 256×256 or 512×512. Consequently, a certain threshold value is determined for the brightness of the image. It is determined whether a intensity value (or an allocated digital value) of each of the pixels is larger than the threshold value or smaller than the threshold value. The intensity value is then replaced by the signal of "1" or "0" corresponding to the result of the determination (FIG. 1C). This is called the image thresholding. Thereafter, the number of pixels of "1" in the thresholded image data is counted. The method utilizes the fact that the brightness of the object to be counted in the image is brighter (or darker) than the brightness of the background (hatched portions in the figure). However, the brightness of the object to be measured or counted is not so stable as to be separated by a constant threshold value. For example, the brightness of the object widely changes dependent on even a subtle difference in the illuminations. In addition, contaminants of different shapes often exist in the same image plane. Therefore, a method called "matched filter method" is often used for emphasizing and separating the video image of the object having a specified shape and a specified brightness distribution.

FIGS. 2A and 2B illustrate the process of the matched filter method. In the following, the matched filter method will be described with reference to FIGS. 2A and 2B.

As shown in FIG. 2A, image information obtained from a television camera has already been digitized and the respective digital have been a certain brightness value for every pixel. A filter 2 comprising N×N (N is an odd-numbered integer) pixels as shown in FIG. 2B is applied to the digitized image 1. The shape of the object which would be extracted is previously represented on the filter 2 as a brightness pattern. It is assumed that F (i,j) denotes the brightness value of the J row, I column position represented in the filter 2, and d (i,j) denotes the pixel data of the j row, i column of the original image 1. The filter 2 is applied to the image 1 in the following manner. Namely, the filter 2 is placed on a certain position of the image plane 1, multiplication of the pixel data d of the image 1 and the pixel data F of the filter 2 is performed for each of the N×N pixels overlapping with each other, and addition of all the results of the multiplication is carried out with the sum being the central data of the region where the filter 2 is placed. Thereafter, the filter is moved column by column (in the direction of the thick arrow in FIG. 2A) and the same operation is repeated. This operation is represented by the following equation.

$$d(i,j) = \frac{1}{A} \sum_{j-\left(\frac{N-1}{2}\right)}^{j+\left(\frac{N-1}{2}\right)} \sum_{i-\left(\frac{N-1}{2}\right)}^{i+\left(\frac{N-1}{2}\right)} F\left(m-\left(i-\frac{N-1}{2}\right), n-\left(j-\frac{N-1}{2}\right)\right) \cdot d(m,n) \quad (1)$$

where A is an appropriately selected constant.

After this operation is carried out, only the image regions having the shape matched with the pixel data patern F (I, J) of the filter 2 are emphasized in the image plane.

FIGS. 3A, 3B, 3C and 3D show an actual example employing the matched filter method In the image plane obtained from a television camera, therer are an object I which should be extracted and a similar object II having a shape similar to the object I (FIG. 3A). When the image on the television screen is digitized, a brightness distribution is obtained which corresponds to the brightness pattern of the objects I and II along the x direction thereof (FIG. 3B). By applying a filter (FIG. 3C) having a simulated brightness pattern with the shape and the brightness distribution of the object I to be extracted from the digitized brightness distribution shown in FIG. 3B, a brightness distribution can be obtained in which the brightness pattern of the object I to be extracted is emphasized (FIG. 3D). By comparing the brightness distribution emphasized by this filter with a certain threshold value, an image thresholding can be carried out in which only the object I to be extraceted, is in fact extracted.

The concept of the filtering has been described using the matched filter method as an example. Other typical filtering methods comprise a unifying process, a boundary line extracting process called Laplacian filter, and so on. These filters are realized by appropriately changing the coefficient values and size of the filter such as shown in FIG. 3C. One example of the unifying process filter is shown in FIg. 4 and one example of the Laplacian filter is shown in FIG. 5, respectively. The manner for these filtering process is the same as that described for the matched filter.

Conventionally, there are two methods for practicing the above described filtering, namely, (1) a method using a computer, and (2) a method using a circuit structured as a dedicated IC.

In the former method, which utilizes a computer, all of the digitized image data are once stored in a memory which is called a frame memory, and the operation represented by the equation (1) is carried out by a program. This method is general-purpose-oriented since the brightness pattern of the filter or the operation following the filtering can be easily selected by the change of the program. However, in this method, the speed of processing depends on the capability of the computer, which is slow in general.

FIG. 6 is a block diagram showing the structure of a dedicated IC which is employed in the second filtering process. In FIG. 6, the dedicated IC comprises a multiplier 5 for multiplying the pixel data FD from the filter and the pixel data ID from the image, an adder 6 which sums up the output of the multiplier 5 and the sum total from a register 7 which stores the sum total output from the adder 6. In the structure of the dedicated IC, first, the pixel data ID from the image and the corresponding pixel data FD from the filter are applied to the multiplier 5, and applied to the adder 6 after the multiplication. The adder 6 receives the output from the multiplier 5 and the sum total till the preceding operation from register 7, sums up thhe both and applies the result to the register 7. The register 7 stores the sum total from thhe adder 6. This operation is repeated N×N times which is the number of the pixels of the filter, and thereafter, the sum of the product $D_{out}$ is outputted from the register 7, thus the filtering of the image is attained.

The filtering method using a circuit with a dedicated IC intends to separate the image filtering process from a computer to further increase the speed of processing. In general, the commercially available image processing device employ this second method wherein the data are continuously stored in the register 7 until the completion of the N×N operations. Therefore, the image data on the image plane should be once stored in the frame memory, so that the speed of operation is not so much improved so as to realize a processing of the same speed as the data process rate on the television image (processing of one image plane in 1/30 second).

The disadvantages of the above described conventional image processing systems will be described with reference to FIG. 7. Referring to FIG. 7, the conventional image processing system comprises a television camera 90 which picks up the object and generates an image information (video signal) corresponding to the object, A/D converter 91 which samples an analogue video signal Θ from the television cammera 90 with a prescribed frequency and quantizes the sampled signal to generate a digital signal Φ, a frame memory 92 for storing the digital signal Φ from the A/D converter 91 for one image plane (one frame), and an image processing apparatus for carying out image processing such as a prescribed filtering on the digital image signal Φ from the frame memory 92.

The number of pixels constituting one image plane is determined by the sampling frequency in the A/D converter 91. In general, the sampling frequency is determined so as to divide one image plane into 256×256 or 512×512 pixel numbers.

The frame memory 92 stores information of color or contrast for every pixel. After the pixel data for one image plane comprising approximately 256×256 or 512×512 pixels are stored in the frame memory 92, the pixel data are read successively by the image processing apparatus 93 in the order of the writing to the memory and a predetermined process is carried out.

In order to effect real time processing in which the video signals Θ obtained from the television camera 90 is processed at the same speed, the processing faculty corresponding to the frame frequency of the television image plane (or screen), that is, 1/30 second is needed. Namely, the image processing must be carried out 30 times per second.

As for the image processing, the real time processing has become possible to same extent by virtue of the development of the dedicated LSI or of the improvements in circuit-confituration. However, in the conventional structure of the apparatus, all the pixel data for one image plane is once written in the frame memory 92 and then the image processing apparatus 93 reads the pixel data from the frame memory 92. Therefore, writing and reading of the pixel data for one image plane to and from the frame memory 92 must be carried out, so that the speed of processing is decreased to ½, whereby real time processing is no longer possible.

On the other hand, the real time image processing has been strongly desired due to the recent trend of speed up in factory automation and so on.

SUMMARY OF THE INVENTION

A main object of the present invention is to eliminate the disadvantages of the above described conventional image processing system, that is, to eliminate the delay in the frame memory, and to provide an image processing apparatus capable of implementing in real time an image processing such as filtering.

A specific object of the present invention is to provide a filter circuit capable of effecting real time filtering without using a frame memory.

Another specific object of the present invention is to provide a digitized circuit capable of real time image processing for the interlace type video signal as well as thhe noninterlace type video signal.

In the filter circuit included in the image processing apparatus in accordance with the present invention, the digital pixel data extracted time-sequentially from the image signals on the television image plane is filtered by p basic filter circuits based on a filter pattern of the p row g column constant coefficients with the basic filters connected in cascade fashion to each other and each of which effects a filtering on the pixel data of 1 row, g column. Each of the basic filter circuits comprises first delay circuits which delays a received pixel data for a time corresponding to one row of the image plane (1 horizontal scanning period) to output the same to the basic filter circuit in the following stage, g multipliers connected in parallel with each other for receiving pixel data and for outputting the same multiplied by the corresponding constant in the constant pattern of the filter, g sets of adders and second delay circuits connected in series with each other provided for each of thhe g multipliers, wherein each of the adders receives the output valve of the multiplier and the output valve from the preceding stage circuit, adds the two valves and outputs the result to the second delay circuit in the same set, and the second delay circuit receives the output of the adder in the same set, delays the same for the time corresponding to one column (1 sampling time) and outputs the same to the adder in the next set.

In a preferred embodiment, in order to apply the information of the interlace type image plane to the image processing portion in real time, a digitizing circuit is provided which comprises first and second frame storage means each of which stores pixel data for one image plane with the pixel data on one horizontal scanning line of the image plane corresponding to one row, a writing circuit portion for writing or entering the digital pixel data from the A/D converter successively into the first and second frame storage means on every other line, a first control portion which controls the writing circuit portion every time the frame changes so as to alternate the writing into the first and second frame storage by every frame, a reading circuit portion for successively reading pixel data from the first and second frame storage means, and a second control circuit portion for controlling the reading circuit portion in such a manner that when writing is carried out in one frame storage reading is carried out in the other frame storage.

In the filter circuit having the above described structure, each of the basic filter circuits carries out filtering for time sequentially applied 1 row q column pixel data and the neighboring basic filter circuit carries out filtering for the pixel data in the neighboring row of the same column. Therefore, the filtering for p row q column pixel data can be carried out at a high speed which is the same speed as the image sampling speed by cascade connected p basic filter circuits without interposing a mamory.

In the frame storage provided in the digitizing circuit, the interlace type image signals are written in each of the frame storage means in the interlace manner and reading is carried out for the frame storage alternately by the framme period in the noninterlace manner. Therefore, writing and reading of the image information for one frame can be carried out simultaneously, whereby video signals of the interlace type can be processed in real time.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 3A to 3D show one conventional example of image processing employing the matched filter method;

FIG. 8A shows the struucture of an image plane to which a filter of FIG. 9 will be applied according to the invention with the image plane being divided into m-row and n-column pixels;

FIG. 8B shows the structure of a filter to which the filter circuit of FIG. 9 will be applied according to the invention showing the structure of a 3-row, 3-column filter;

FIGS. 10(a) and 10(b) show a process of extracting image signals time-sequentially;

FIG. 11 shows the arrangement of pixel data obtained when the image information shown in FIG. 8A is A/D converted to a time sequential pixel data stream;

FIG. 15 shows a writing/reading operation sequence for the pixel data in the frame memory in the digitizing circuit shown in FIG. 13.

DESCRIPTION OF THE PREFERRED EMBODIMENTS AND THE BEST MODE OF THE INVENTION

Description will be made of a case in which $3 \times 3$ (3 rows 3 columns) filtering as shown in FIG. 8B is carried out for the image data on the image plane or on a screen of $m \times m$ (m rows, m columns) shown in FIG. 8A. The constant pattern of F1 to F9 of the filter shown in FIG. 8B is set beforehand corresponding to the shape and brightness pattern of the object to be extracted when the filter is used as a "matched filter", and the same is set to be a pattern of prescribed constants when it is used as any type of different filter.

Figure 1A:
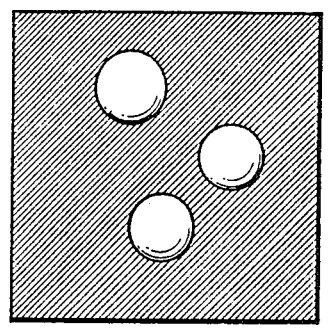
FIGS. 1A to 1C show the conventional process of image thresholding on the image plane.
Figure 1B:
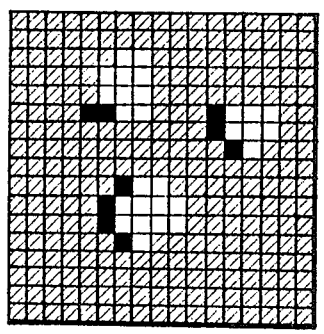
Figure 1C:
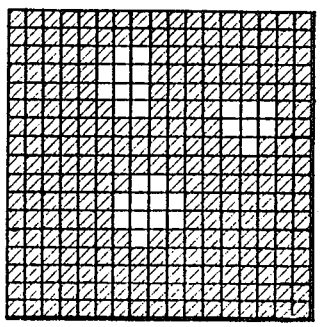
Figure 2A:
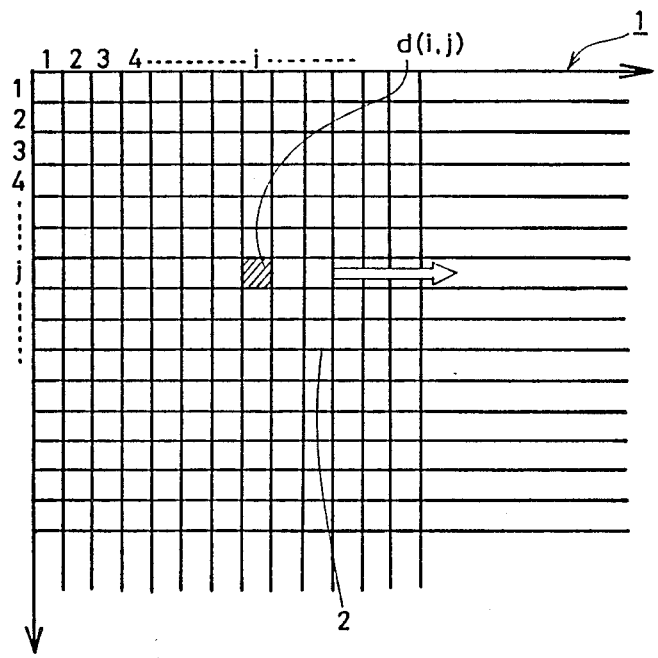
FIGS. 2A and 2B show the conventional method of matched filtering of the binarized image.
Figure 2B:
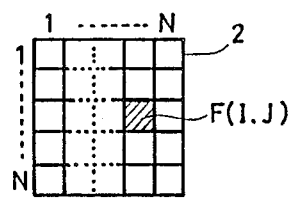
Figures 4, 5, 6:
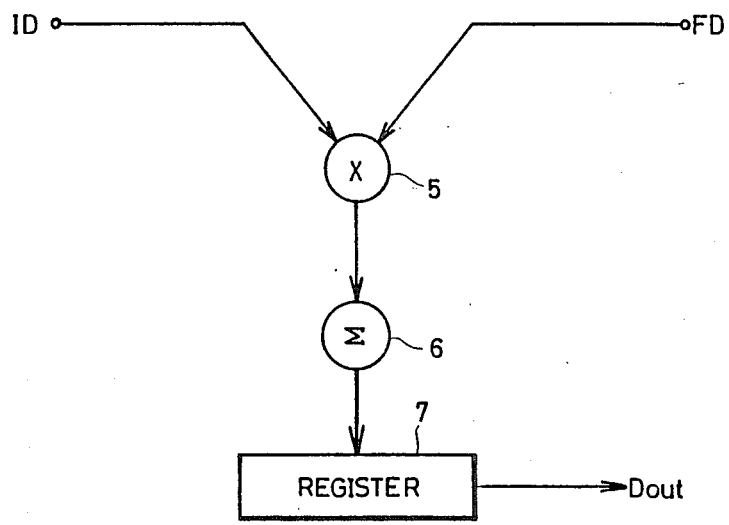
FIG. 4 shows one conventional example of the unifying process filter.
FIG. 5 shows one conventional example of Laplacian filter structure.
FIG. 6 shows the conventional structure of a dedicated IC employed in the conventional filter method.
Figure 7:
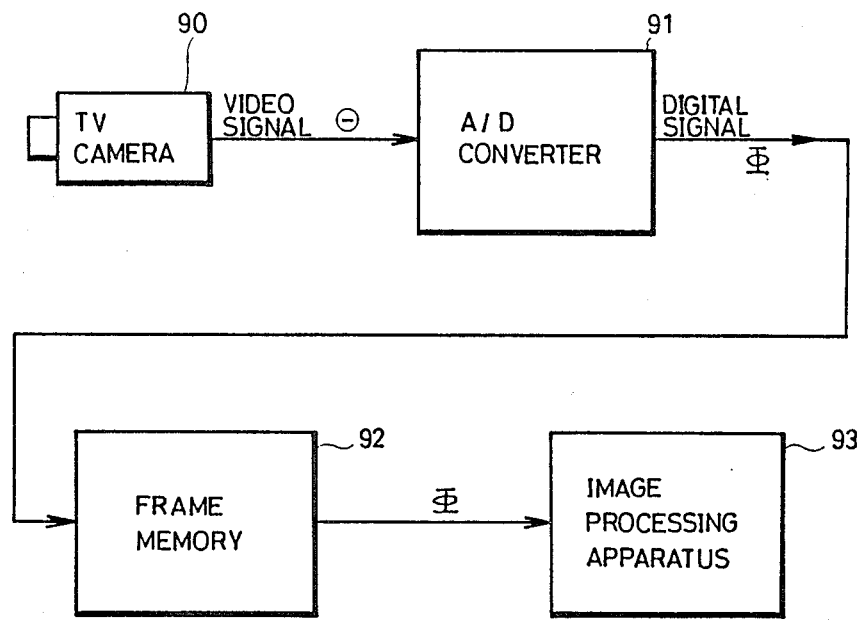
FIG. 7 shows schematic structure of a conventional image processing apparatus.
Figure 9:
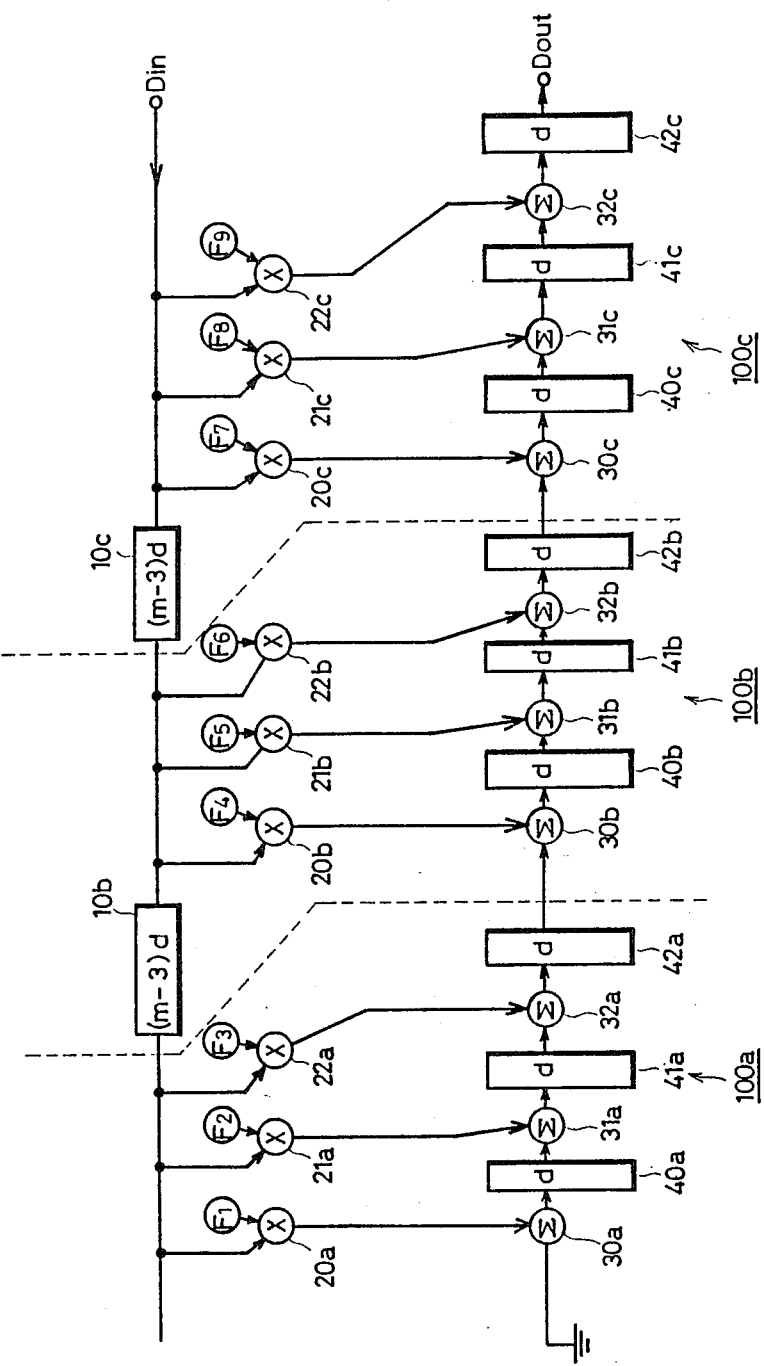
FIG. 9 is a block diagram showing the structure of a filter in accordance with one embodiment of the present invention.

FIG. 9 is a block diagram showing the structure of a filter in accordance with one embodiment of the present invention. The structure of the filter shown in FIG. 9 is to perform $3 \times 3$ (3 rows, 3 columns) filtering on the image plane data constituted by m rows and m columns pixels.

In FIG. 9, the filter comprises basic filter circuits 100a, 100b and 100c connnected in cascade fashion with each other. Each filter circuuit preforms a filtering for a pixel data chain from 1 row and 3 columns. The basic filter circuit 100a filters on the pixel data chain in the first row, the basic filter circuit 100b filters on the pixel data chain in the second row and the basic filter circuit 100c filters on the pixel data chain in the third row.

The basic filter circuit 100a for the first row comprises multipliers 20a, 21a and 22a which multiply received pixel data by a predetermined constants of F1, F2 and F3 in the first row of the filter, respectively, an adder 30a which adds the output of the multiplier 20a and the ground terminal output (information "0"), a delay circuit 40a which receives the output of the adder 30a and outputs the same with a delay of one clock time duration d an adder 31a which receives and adds the output of the delay circuit 40a and the output of the multiplier 21a, a delay circuit 41a which receives the output of the adder 31a and outputs the same with a delay of one clock, an addere 32a which recevies and adds the output of the delay circuit 41a and the output of the multiplier 22a, and a delay circuit 42a which recevies the output of the adder 32a and outputs the same with a delay of one clock. The one clock period or time duration d is one period of a clock signal which gives the operation timing for each circuit, and the circuits are driven in synchronization with each other by clock signals having the same period d. The delay of one clock period d means one column delay of the pixel data.

The basic filter circuit 100b in the second row has the same structure as the basic filter circuit 100a in the first row and comprises a delay circuit 10b which transfers recevied pixel data to the basic filter circuit 100a in the first row with a delay of (m−3)d, multipliers 20b, 21b and 22b which multiply received pixel data with the second constant pattern of F4, F5 and F6 of the filter, respectively, an adder 30b, a 1d delay circuit 40b, an adder 31b, a 1d delay circuit 41b, an adder 31b, and a 1d delay circuit 40b, provided in correspondence with the multipliers 20b, 21b and 22b, respectively.

The basic filter circuit 100c in the third row comprises a delay circuit 10c which receives the pixel data applied time-sequentially and outputs the same to the basic filter circuit 100b with a delay of (m−3)d, multipliers 20c, 21c and 22c which receive the supplied pixel data time-sequentially and multiply the same by the respective constants of F7, F8 and F9 in the third row of the filter, an adder 30c, a 1d delay circuit 40c, an adder 31c, a 1d delay circuit 41, an adder 32c, and a 1d delay circuit 42c provided in correspondence with the multipliers 20c, 21c and 22c, respectively. The adders 30c, 31c and 32c and the delay circuits 40c, 41c and 42c are alternately connected in series with each other and the result $D_{out}$ of the 3 row, 3 column filtering is outputted from the 1d delay circuit 42c. A commonly-used register is employed for the 1d delay circuits 40a, 41a, 42a, 40b, 41b, 42b, 40c, 41c and 42c, and a shift register is used for a delay circuit having a longer delay time than 1d.

FIG. 10 shows the process of time sequentially extracting image signals obtained from a television camera to the pixel data. As shown in FIG. 10, the analog image signal obtained from the television camera itself is time-sequential, and a horizontal synchronizing signal is interposed in every horizontal scanning period H as shown in FIG. 10(a). Therefore, the analog signal is sampled with a predetermined sampling frequency so as to divide one horizontal scanning period H into m segmets using the horizontal synchronizing signal as a timing signal. Thereafter, to an analog digital conversion is performed at high speed to obtain digital data such as shown in FIG. 10(b) which are obtained sequentially. The time sequential digital pixel data obtained in the above described manner are utilized as the input data Din of the matched filter as a stream of pixel data shown in FIG. 11. In this manner, the analog image signals obtained from the television camera is AD converted at high speed to obtain the image plane data as a stream of time sequential data, so that no extra memory is required.

As shown in FIGS. 8A and 8B, the data stream which is to be obtained after filtering in the filtering process of the image plane data is, for the first row, $$a_1F1 + a_2F2 + a_3F3 + a_{m+1}F4 + a_{m+2}F5 \\ + a_{m+3}F6 + a_{2m+1}F7 + a_{2m+2}F8 + a_{2m+3}F9, \quad (2)$$

for the second row, $$a_2F1 + a_3F2 + a_4F3 + a_{m+2}F4 + a_{m+3}F5 \\ + a_{m+4}F6 + a_{2m+2}F7 + a_{2m+3}F8 + a_{2m+4}F9, \quad (3)$$

and finally, $$a_{(m-2)m-2}F1 + a_{(m-2)m-1}F2 + a_{(m-2)m}F \\ 3 + a_{(m-1)m-2}F4 + a_{(m-1)m-1}F5 \\ + a_{(m-1)m}F6 + a_{mm-2}F7 + a_{mm-1}F8 + a_{mm}F9. \quad (4)$$

A 3-row, 3-column filtering operation on the time sequential pixel data shown in FIG. 11 will now be described. Again d is the period of the clock signal driving each of the circuits in the filter. A stream of time sequential pixel data shown in FIG. 11 is applied to the circuit input Din of the filter shown in FIG. 9, with one pixel data in every clock period d. Let us consider the operation when the time of 2(m−3)d passed after the pixel data a1 is initially inputted.

At the time t=2(m−3)d, the pixel data a1 which is supplied at the time t=0 is supplied to the basic filter circuit 100a in the first row from the delay circuit 10b. The pixel data a1 is multiplied by F1, F2 and F3, respectively, in the multipliers 20a, 21a and 22a. What is needed now is only the multiplied value of the pixel data a1 and the constant F1 of the filter, i.e. the output from the multiplier 20a, and therefore only the flow of the product a1·F1 of the pixel data a1 and the constant F1 of the filter is considered. The output of this multiplier 20a is applied to the adder 30a and thereafter stored in the delay circuit 40a.

At the time t={2(m−3)+1}d, a pixel data a2 is applied to the filter circuit 100a from the delay circuit 10b, a product a2·F2 is obtained in the multiplier 21a and is applied to one input of the adder 31a. On this occasion, the value of a1·F1 from the delay circuit 40a is applied to the other input of the adder 31a, so that the output of the multiplier 21a and the output of the delay circuit 40a, that is, the data of a1·F1 + a2·F2 is supplied to the delay circuit 41a and is stored there for one clock period d. At the time t={2(m−3)+2}d, a pixel data a3 is applied to the basic filter circuit 100a from the delay circuit 10b. The pixel data a3 is applied to the multiplier 22a and the product with the constant F3 of the filter is obtained and applied to the adder 32a. The adder 32a adds the output of the delay circuuit 41a and the output of the multiplier 22a and applies the result to the delay circuit 42a. Therefore, on this occasion, the data of a1F1 + a2F2 + a3F3 is applied to the delay circuit 42a.

At the time t={2(m−3)+3}d, the pixel data $a_{m+1}$ of the next row is applied from the delay circuit 10c to the basic filter circuit 100b in the second row. The muliplication of the pixel data $a_{m+1}$ and the constant F4 is carried out in the multiplier 20b and the result is applied to the adder circuit 30b. Since the adder 30b adds the output of the multiplier 20b and the output of the delay circuit 42a, the output of the adder 30b becomes a1F1 + a2F2 + a3F3 + $a_{m+1}$F4, the value being applied to the delay circuit 40b. Continuing the similar operation, the operated data proceed to the right side of the figure with each clock signal in the output data line comprising the adders and delay circuits of the matched filter shown in FIG. 9 and the product sum of the pixel data and filter constant which should be added in the next step is added by each of the adders. The delay of (m−3)d effected by the delay circuits 10b and 10c shifts the pixel data by one row so as to ensure the correct summing of the products.

When the time of {2(m−3)+9}d has passed after the pixel data a1 was inputted as the input data Din, the output data $D_{out}$ is obtained, which is represented by the above equation (2). Thereafter, the results of the summing of the products with the filter shifted by one column at each clock signal d are successively obtained. On this occasion, before the time when the data represented by the equation (2) is obtained, invalid data are outputted. In order to distinguish the undesired data from the desired data, a counter means, not shown, may be provided for counting the clock signals from the time the first pixel data a1 is inputted until the output data appear after the time {2(m−3)+9}d has lapsed, whereby the necessary data can be easily distinguished from those not necessary.

Instead of the above described counter means, a delay circuit may be separately provided to obtain the same effect. In this configuration, an indication bit is generated in synchronization with the initial pixel data a1 and the separate delay circuit delays the same for the same period of time as the pixel data a1 is subjected to, and the data outputted from the matched filter may be successively outputted when the indication bit generated in synchronization with the pixel data a1 is applied to the filter output portion from the separate delay circuit.

The most significant characteristic of the circuit structure of the above described filter is that the time sequential data which are directly AD converted video image signals from a television camera are inputted and the result of the product-summing can be obtained in response to the clock signals, and that a very real time processing of filtering is accomplished by using, as the clock signal, the clock having the same frequency as the sampling frequency for the AD conversion. Each of the basic filter circuits 100a, 100b and 100c has the same circuit structure, so that a plurality of circuits of the same structure may be produced to be connected in cascade fashion for implementing the filter circuit in practice. By virtue of the recent development of IC technologh (integration technology), the basic filter circuit can be implemented by an LSI, and, in that case, only three LSIs are required for the structure, thereby providing a compact structure.

Although 3-row, 3-column filtering is described in the foregoing, the invention can be easily expanded to the filtering of N×N (N row N column). Namely, in that case, the N basic filter circuits are connected in cascade fashion and in the internal structure of each basic filter circuit, the number of each operation (element such as the multipliers, adders and 1d delay circuits) is increased to N. In that case, the delay time of the output data in the line becomes Nd, so that the delay time in the delay circuit 10b and 10c for delaying the pixel data by one row becomes (m−N)d.

Figure 12:
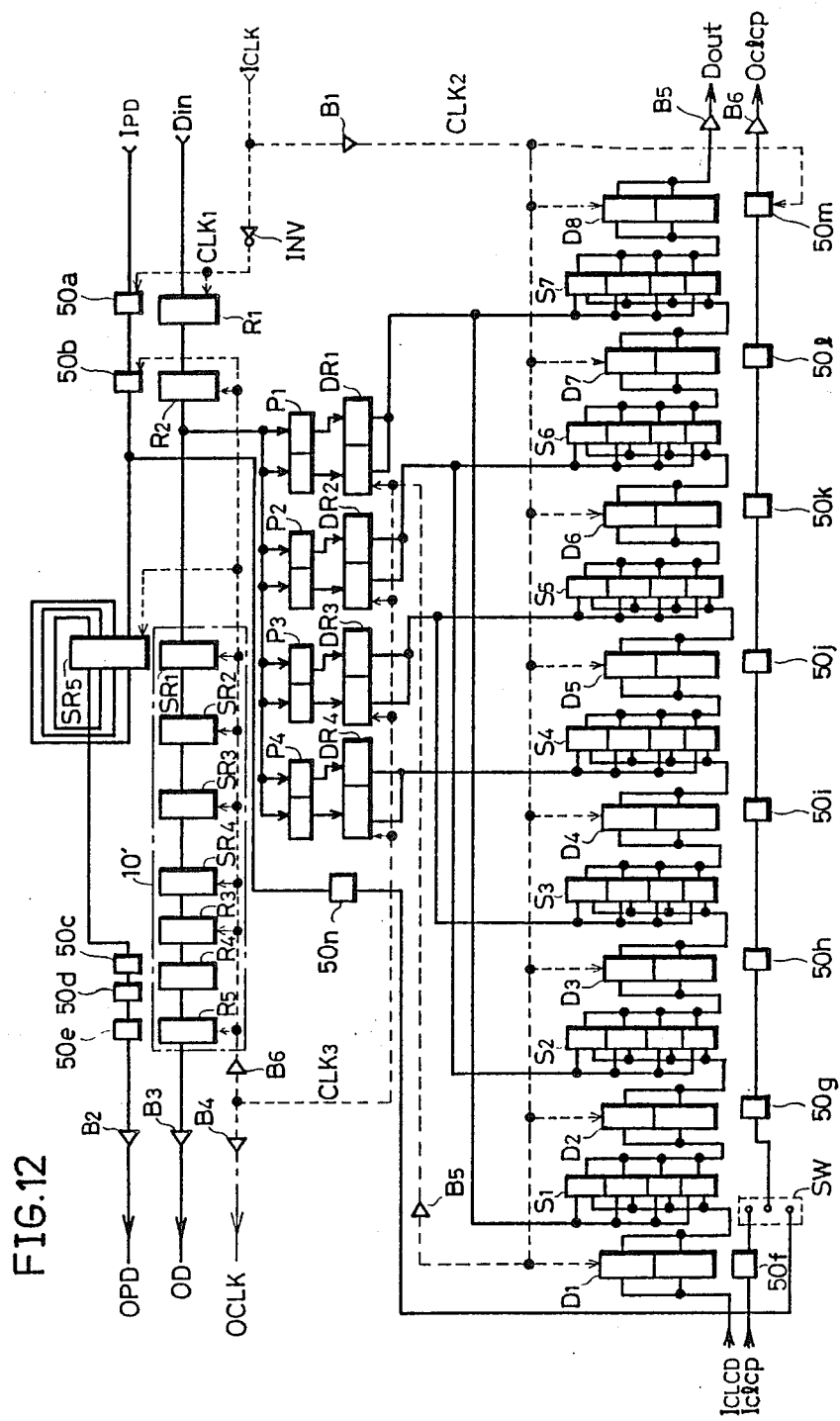
FIG. 12 shows one example of a specific structure of the filter circuit in accordance with the present invention.

FIG. 12 is a detailed block diagram showing one example of a specific structure of the filter circuit in accordance with the present invention. In FIG. 12, a complete circuit capable of 7-row, 7-column filtering is shown. The basic filter circuit shown in FIG. 12 is capable of 1 row 7 column filtering, and 7-row, 7-column filtering is achieved by a cascade connection of seven basic circuits as shown in FIG. 12.

In the basic filter circuit of FIG. 12, the delay circuit for delaying received pixel data for one row operates in response to a clock signal CLK1. The basic filter circuit comprises a register R1 which outputs the received data with a delay of one clock period. a registe R2 which operates in response to the clock signal CLK3 and outputs the received data with a delay of one clock period, and a group of shift registers 10' which operate in response to the clock CLK3. The shift register group 10' comprises shift registers SR1, SR2, SR3 and SR4 which operate in response to the clock signal CLK3 to output received data with a delay for a prescribed period, and delay registers R3, R4 and R5 which operate in response to the clock signal CLK3 and output received data with a delay of one clock period. A shift register is incorporated in the delay circuit 10' for putting the input data with a delay for a time period approximately corresponding to one row. However, since a larger number of delay circuits for one clock period are provided compared with the structure of FIG. 9 for the purpose of matching clock signals and so on, the shift registers are not of the (M−7) stage type. In the above described structure, a basic filter circuit is assumed to be applied on an image plane having 512 rows and 512 columns namely, M=512, so that the delay time for each of the shift registers SR1 to SR4 is assumed to be 125d (d is the period of the clock signal CLK3. The output of the shift register group 10' is applied to the adjacent basic filter circuit in the succeeding stage as a pixel data OD.

The multipliers for the multiplication of the pixel data and the filter constant comprise programmable read only memory (PROM) P1, P2, P3 and P4, and data registers DR1, DR2, DR3 and Dr4 which receive the output of each of the PROMs and delay the same for one clock period, respectively. Each of the PROMs P1 to P4 receives the pixel data as an address signal, respectively, and the result of the multiplication of the pixel data (i.e. address) and a predetermined filter constant is stored in each of the PROMs P1 to P4 as the data for that address. The output of the data register DR1 is applied to adders S1 and S7, the output of the data register DR2 is applied to the adders S2 and S6, the output of the data register DR4 is applied to adders S3 and S5, and the output of the data register DR4 is applied to an adder S4.

The sets of adders and delay circuits for summing the outputs from the multiplier are constituted by the adders S2 to S7 and delay circuits D1 to D8. The delay circuits D1 to D8 operate in synchronization with the clock signal CLK2 and outputs received data with a delay of one clock period. In the above structure, the pixel data is represented by eight bits and the result of product summing operation is represented by sixteen bits.

In the structure of FIG. 12, a circuit is further provided in which one bit signal experiences the same delay time as the pixel data. Namely, a head indicating data line for indicating the first bit of the pixel data is provided. The delay circuit for transferring the head indicating bit $I_{PD}$ to the basic filter circuit in the subsequent stage, comprises a flip-flop 50a which operates synchronously with a cock signal CLK1, a flip-flop 50b which operates synchronously with the clock signal CLK3, a shift register SR5 which operates synchronously with the clock signal CLK3 and flip flops 50c, 50d and 50e which operate synchronously with the clock signal CLK3. By the path of the series connected flip flops 50a to 50e and the shift register SR5, the delay time corresponding to one row of the pixel data is applied to the head indicating bit. The head indicating bit which passed this path is applied to the basic filter circuit of the next stage through a buffer B2 as an output bit OPD. The head indicating bit Iclcp from the next stage is applied to a buffer B6 through flip flops 50f, 50g, 50h, 50i, 50j, 50k, 50l and 50m which operate in synchronization with the clock signal CLK2 and, thereafter, outputted as an output head indicating bit Oclcp. In this manner, the head indicating bit Iclcp is subject to the same delay time as the pixel data on the output data line. When this basic filter is used as the basic filter for the first row, it need not experience the delay time of the pixel data for one row. Thus, a flip flop 50n is provided which operates in synchronization with the clock signal CLK3 for receiving the output of the flip flop 50b. The output of the flip flop 50n is applied to one terminal of a switch SW. The output of the delay flip flop 50f is applied to the other terminal of the select switch SW, the terminals of the select switch SW are switched corresponding to the circuit structure and either of the outputs is applied to the flip flop 50g. Therefore, the head indicating bit $I_{PD}$ is subject to the same delay time as that of the pixel data. Thus, by inputting one pulse as a head indicating bit $I_{PD}$ simultaneously with the first bit of the pixel data, both bits are simultaneously outputted when the first pixel data after completion of filtering, is outputted from the basic filter circuit in the last stage, so that there is no need of counting clock signals to obtain the timing of the pairs of the output data after filtering, and the required heading position of the pixel data stream can be easily detected.

As for the method for generating the head indicating bit, a pulse may be generated in synchronization with a first sampling pulse given after the vertical synchronizing signal in the image plane data, for example, whereby it can be easily generated in synchronization with the heading bit of the leading pixel data.

The clock signal CLK1 is obtained from the input clock signal $I_{CLK}$ through the inverter IND, the clock signal CLK2 is obtained from the input clock signal $I_{CLK}$ through the buffer P1$_7$ and the clock signal CLK3 is obtained from the input clock signal $I_{CLK}$ throughh the buffer B1 or the buffers B5 and B6. The clock signal CLK3 is transferred through the buffer B4 as an input signal OLSK to the basic filter circuit in the next stage. Therefore, each circuit is capable of a synchronous operation. A clock signal having the same frequency as the sampling frequency used in digitally converting thhe image signal is used as the input clock signal $I_{CLK}$, since the pixel data is time-sequentially applied from the pixel data in the image plane and the state of operation of each circuit is changed by simultaneously receiving the clock signal each time the pixel data Din is applied. The clock signals must be generated in synchronization with the sampling operation of the high speed AD converter. For example, if the image signal from the video should be divided into pixels of 512 row 512 column, the sampling frequency becomes 12.5 MH$_Z$. Therefore, the input clock signal $I_{CLK}$ also has the frequency of 12.5 MH$_Z$. In that case, all circuits included in the basic filter circuit are constituted by high speed ICs so that they operate at the clock frequency of 12.5 MH$_Z$.

The above described structure enables real time image processing, since there is no need for storing the image data in the frame memory.

However, if the pixel data applied to the above described filter circuit are image signals of the noninterlace type, thhe pixel data for one imate plane are successively applied. On the other hand, if the pixel data are image signals of the interlace type some problems may arise.

Usually, if an object to be measured is picked up by a television camera, an image plane in accordance with the interlace type is obtained. In the interlace type, one image plane (1 frame) is constituted by 2 fields. Namely, the horizontal scanning is carried out from the top to the bottom for every other horizontal scanning line, and after the scanning of one image plane (more precisely, one field) it goes back to the top and the horizontal scanning is carried out for every remaining horizontal scanning lines. Two times of image plane scanning accomplish the scaning of the entire complete one image plane. Namely, first, the odd-numbered horizontal scanning lines are scanned and second, the even-numbered horizontal scanning lines are scanned. The scanning for one complete image plane is effected by both scannings.

The interlace type has the advantage that flicker in the image plane can be reduced. Consequently, in almost all cases scanning of the video signals is of the interlace type. However, if a video signal Θ of the interlace type is directly AD converted to be outputted, then incomplete ½ image plane data (data for one field) are provided twice for one image plane. Therefore, if these data should be directly transferred to the image processing apparatus such as a filter circuit, the operation in the image processing side becomes complicated, since another operation is required for converting the incompleter data into the complete pixel data for one image plane. Especially, in the case of the above described filter circuit, the pixel data stream is directly received for processing, and filtering is carried out in accordance with an incomplete image information, so that sometimes correct image processing cannot be carried out.

On the other hand, in the noninterlace type, the horizontal scanning is carried out successively for every line from the top to the bottom. However, the noninterlace type has disadvantages that flickers are generated in the image plane so that the application thereof is limited to the case of small a number of scanning lines. The smaller the number of the scanning line becomes, the lower the resolution becomes, so that it is not preferable for image processing.

Figure 13:
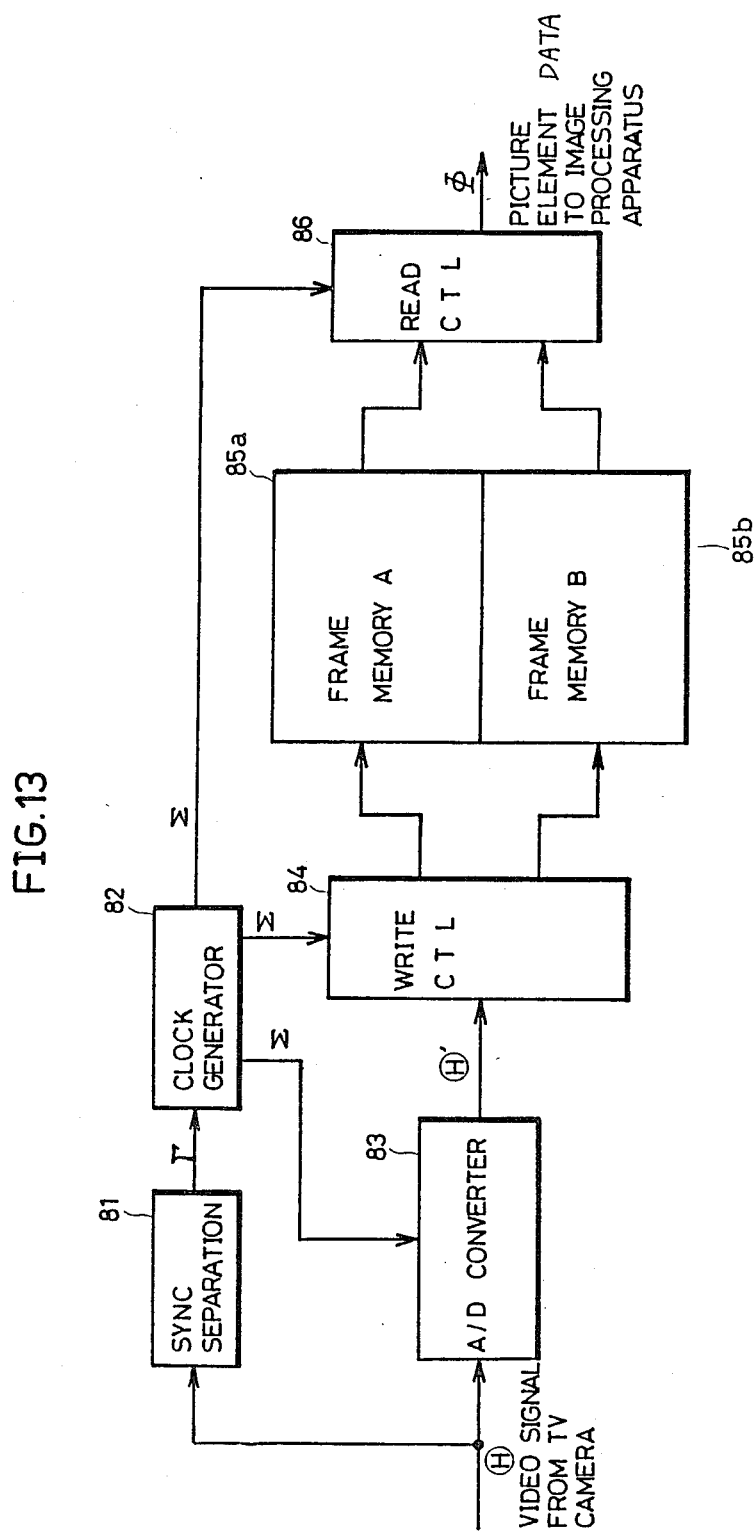
FIG. 13 shows thhe structure of a video signal digitizing circuit which converts the interlace image signal into the noninterlace image signal, employed in a preferred embodiment of the present invention.

In order to avoid the disadvantages in the filtering process of the interlace type image, a structure shown in FIG. 13 is applied.

FIG. 13 shows a structure for processing interlace type image signal in real time. Referring to FIG. 13, a digitizing circuit comprises a synchronizing signal separating circuit 81 which separates and extracts synchronizing signals (horizontal and vetical synchronizing signals) Γ from the video signal Θ, a clock signal generation circuit 82 which generates a clock signal Σ based on the synchronizing signals from the synchronizing signal separation circuit 81, and A/D converter 83 which samples, quantizes and converts an analogue video signal Θ to the digital signal in response to the clock signal Σ, a writing control circuit 84 which writes the digital video signal (pixel data) from the A/D converter 83 into the frame memories A and B in the interlace manner alternately for one image plane (i.e. 1 frame) in response to the clock signal Σ, frame memories A and B which store the pixel data from the writing control circuit 84 in the interlace manner for storing the pixel data for one image plane, and a reading control circuit 86 which reads the pixel data in the noninterlace manner alternately from the frame memories A and B for every frame period in response to the clock signal Σ to apply the same to the image processing apparatus in the succeeding stage, for example, a filter circuit.

The synchronizing signal Γ gives the timing for the heading of the image plane or for the start of horizontal scanning to start the Ad conversion.

The clock generator 82 is constituted by a PLL circuit and the like. The clock signal Σ gives the timing for AD conversion in the AD converter 83, the timing for writing and reading in the writing control circuit 84 and in the reading control circuit 86 and the timing of switching the frame memories to be accessed.

The AD converter 83 samples the analogue video signal Θ in response to the clock signal and quantizes the sampled signal to n-bit data. Consequently, the intensity signal for one pixel is outputted as an n bit digital data. Such AD converter 83 is easily structured by a commercially available dedicated LSI.

The write control circuit 84 writes the digital pixel data into either one of the frame memory A85a and the frame memory B85b alternately at every frame. On this occasion, assuming that one frame is constituted by two fields, the write control circuit 84 writes the pixel data of the first field into the odd-numbered rows in one frame memory 85a or 85b and writes the pixel data of the second field into the even-numbered rows of the same. At that time, no data is written into the other frame memory. When the writing of the pixel data for one frame into one frame memory is completed, the write control circuit 84 writes the pixel data to the other frame memory in the similar sequence as described above. The writing into every other line of the frame memory the writing in the interlace manner is effected by switching the row address between the odd-numbered address and even-numbered address by the field period.

The frame memories A and B (85a, 85b) respectively store the n-bit pixel data for one image plane and a 256 row 256-column or a 512-row 512-column structure may be employed in correspondennce with the number of pixels constituting the image plane.

The read control circuit 86 reads the pixel data seccessively from the frame memory in response to the clock signal Σ. On this occasion, when the writing of pixel data is being carried out in the frame memory A85a, the pixel data is read from the frame memory B85b. The reading of the pixel data is successively carried out from the first row of the image plane and no interlace reading is carried out. The reading from the frame memory is switched by the frame period. Therefore, the pixel data Φ of the noninterlace type are successively outputted from the read control circuit 86. As a result, the pixel data stream constituting a complete one image plane can be obtained.

In this structure, access to the two frame memories can be switched by the frame period, whereby the writing and reading of the pixel data can be carried out simultaneously, so that a correct image processing in real time becomes possible for the interlace type image information.

The details of the operation are described with reference to FIG. 14.

The AD converted video data Θ' are written into one frame memory A through the write circuit 84. The input video signal is obtained by the horizontal scanning of every other line since the video data is obtained by the interlace type scanning. Therefore, the data is written in every other line in the frame memory A. the data for the complete one image plane are provided in the frame memory by scanning twice. The writing into the frame memory A is represented by the lines with arrows in FIG. 14. The solid lines show the first scanning (odd-numbered rows or horizontal line) and dotted lines show the second scanning (even-numbered rows).

When the writing into the frame memory A is completed, the write control circuit 84 switches the memory in response to, for example, the vertical synchronizing signal and the writing into the frame memory B begins.

The pixel data of the succeeding image plane is written into the frame memory B. The order or sequence of writing is similar to that of the frame memory A and hroizontal scanning of every other line is carried out from the top to the bottom and again horizontal scanning is carried out for ever remaining lines. All pixel data for the next image plane are written by scanning twice.

As for the reading side, the data is read from the opposite frame memory to the one into which thhe image data are presently being written. Even if the video signal is of the interlace type, the pixel data are arranged from the top to the bottom corresponding to the image plane in the same manner as in the noninterlace type when the writing is completed. Therefore, the data in the frame memory can be read out from the top line to the bottom line without any jumping.

Figure 14:
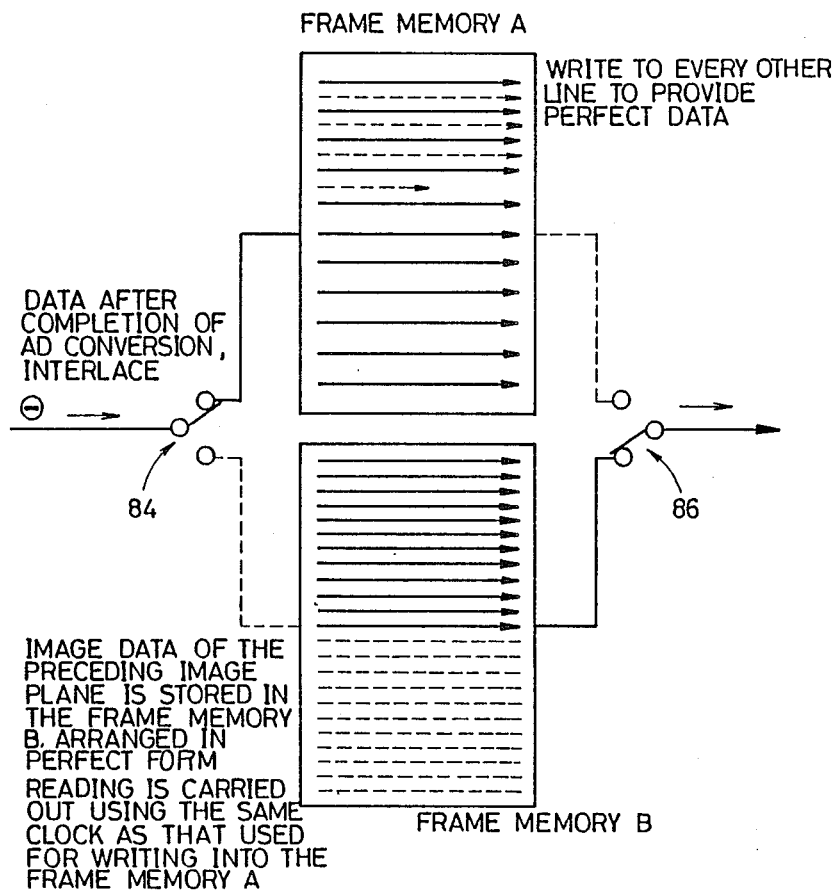
FIG. 14 schematically shows the time dependent change of the image data in the frame memory.

In FIG. 14, writing is carried out to the frame memory A. At that time, reading is carried out from the frame memory B.

The data of the preceding image plane are stored in the frame memory B arranged in a perfect form namely in order of the noninterlace type scanning of the pixels. The data is read in the same scanning order as the noninterlace type.

The clock for reading is the same as that giving the timing for writing to the frame memory A.

When the reading and writing are completed, the writing into the frame memory B and the reading from the frame memory A are started. This sequence is continuously repeated.

When one frame memory is under the writing sequence, the other frame memory is under the reading sequence. This relation is alternated at every image plane.

The states of the frame memories A and B and the output data are shown in FIG. 15. The movement in the frame memory A, the movement in the frame memory B and the content of the image plane data output from the read control circuit are shown on a time base from left to right. The lapse of time is denoted by I, II to IV. The same operation continues before and after the operation shown in the figure. The image plane is assumed to change 30 times in a second with a frame frequency of 1/30 sec. One image plane is assumed to be divided into 512×512 pixels. The existence of an many pixels data defines one image plane. The image planes are denoted by C, D, E, F, . . . , Z.

In the period I, the image plane C is written or inputted into the frame memory B. The image plane Z is read or outputted from the frame memory A. The image plane data output from the read control circuit is the image plane Z.

In the period II, the image plane C is outputted from the frame memory B and the image plane output from the video I/F board forming a read control circuit, is also the image plane C. The image plane D is inputted into the frame memory A.

In the period III, the image plane D is outputted from the frame memory A. The image plane E is inputted into the frame memory B.

The same operations are repeated in the following periods.

Now, the input and output of the image planes C, d, E, . . . mean the writing and reading into and from the frame memory of the 512×512 pixel data. Assuming that one pixel data is n bit, the total number of the data will be 512×512 ×n.

If H represents one horizontal scanning period, the reading and writing operation period for one image plane will be 512H.

The reading and writing operation for one image plane is illustrated in detail in the intermediate portion of FIG. 15. The numerals surrounded by a box show the line number from the top of the horizontal scanning lines and not the pixel number itself.

Since the writing or input of the image plane B is of the interlace type, it is carried out for every other line. The numerals show the line numbers and the writing proceeds from the first line to the third line, fifth line, . . . and so on. Since 512 pixels are contained in each one line, 512 data are scanned. Thus, all odd-numbered lines are horizontally scanned down to the 511-th line. Thereafter, even-numbered lines are horizontally scanned from the second line to the fourth line, sixth line, . . . and so on. When all the lines to the 512-th line have been scanned, all data (512×512) for one image plane have been written.

The output of the image plane A is more simple. the output is carried out in line-by-line fashion from the first line to the 512-th line. The image plane data output from the read control circuit is carried out in the similar manner, namely, it is outputted from the first line, second line, . . . , 512-th line. This step is implemented, for example, by incrementing the address for the memory in the read control circuit.

The contents of the scanning for one line is shown in the lowermost stage g of FIG. 15. A continuous long box represents one line. The subdivided box represents one pixel. The numerals 1, 2, 3, . . . , 512 show the numbers of the pixels arranged horizontally in the stream. In this example, the scanning time for one pixel is 81.65n sec.

In accordance with this structure, the successively changing image planes are alternately written and read into and from the two frame memories to be image processed, so that even images of the interlace type can be image-processed in real time.

The image plane data applied to the image processing circuit is delayed for one image plane by a 1/30 second delay from the image plane which is presently being picked up by the television camera. However, the image plane data are applied to the image processing circuit without a break. The alternation of the frame memories and timing for switching between the odd-numbered lines and even-numbered lines can be easily implemented by employing a vertical synchronizing signal included in the analogue video signal.

By using the digitizing circuit incorporated with the above described filter circuit, the filtering can be carried out in real time using a conventional interlace type video signals.

When the digitizing circuit is used by itself, it can be applied not only to the above described filtering operation but also to various image processing or image measuring apparatuses for digital image processing such as image thresholding, extracting of borders, detection of the position, shape, movement of an object, and so on.

As described above, in the filter circuit in accordance with the present invention, a basic filter circuit is structured by appropriately incorporating a first delay circuit for delaying a pixel data for a time period corresponding to one row, a second delay circuit for delaying the data for the period corresponding to one column, one clock period, a multiplier for performing multiplication of the pixel data and a filter constant and an adder for summing the output of the multiplier and the output of the delay circuits. The filter circuit is structured by a cascade connection of the basic filter circuits to receive a time sequential pixel data stream obtained from AD conversion of the video signal. The pixel data circulates the filter circuit to provide the result of filtering, resulting in the real time processing of filtering without a frame memory. Since the circuit structure of the filter circuit simply comprises a repetition of cascade connections of the same basic filter circuits, the manufacturing and adjustment thereof are easy, and in addition, the structure of each circuit is simple and suited for LSI implementation.

The structure of the filter circuit in accordance with the present invention enables a real time filtering, so that it is useful in various automating image processing, especially in extracting objects of the same shape and counting the number or the area thereof. It is especially useful in automating microscopic detection process of blood or other body fluids, the cell cultivation inspection process, the grain size inspection of metal surface, and so on.

By the digitizing circuit in accordance with the present invention, a pixel data for a complete 1 image plane one frame can be obtained in real time even for the video signal of the interlace type, so that it is effective in real time image processing or image measurements.

Specifically, if the filter circuit and the digitizing circuit are incorporated, the filtering in real time can be performed on the interlace type video signals with a simple circuit structure, realizing correct filtering in real time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A filter circuit for digitally processing video image information of an object to be measured in real time, said video image information being included in an image plane constituted by pixels arranged in a matrix of m-rows and n-columns m and n each being a natural number, based on a pattern of predetermined constants of p-rows and q-columns p and q each being natural numbers, respectively satisfying the condition of p<m and q<n, comprising: time sequential output means for time sequentially extracting and outputting pixel data from said image plane; and cascaded filter circuit means connected to said sequential output means for filtering said pixel data, said cascaded filter circuit means comprising a number p of basic filter circuits (100a, 100b, 100c) connected with each other in cascade fashion to form said cascaded filter circuit means, each of said basic filter circuits carrying out an extraction based on said pattern of predetermined constants for the pixel data of one row and q-columns, each of said basic filter circuits comprising first delay means (10) for applying received pixel data to the basic filter circuit of the succeeding stage with a delay of a time corresponding to one row of said image, a number of q-multipliers (20, 21, 22) directly connected in parallel with each other, each multiplier multiplying the received pixel data with a corresponding constant of said pattern of constants for outputting, and a number of q-sets of adders (30, 31, 32) and second delay means (40, 41, 42) receiving the output of said adders provided corresponding to each of said multipliers, wherein said q-sets of adders are connected in series with each other, each of said q-adders summing the corresponding multiplier output and the output of the respective basic filter circuit in the preceding stage for outputting the sum to the second delay means in the same set whereby said second delay means receives an output of the adder in the same set and applies a delayed output to the adder in the succeeding set with a delay time corresponding to one column of said image, said filter circuit further comprising means (81) for generating a head indicating bit ($I_{clcp}$) indicating the initial bit position of one row of the pixel data from said time sequential output means, and third delay means (50f to 50l, 50m, SW) connected to receive said head indicating bit from said head indictating bit generation means, said third delay means delaying said head indicating bit for a time duration corresponding to a delay time applied to said pixel data.

2. The filter circuit according to claim 1, wherein each of said multipliers comprises a programmable read-only memory (P1, P2, P3, P4) for receiving pixel data as an address input, said multipliers storing the product of the corresponding constant of said pattern of predetermined constants and said pixel data for each of said address.

3. The filter circuit according to claim 1, wherein said time sequential output means comprises: means (83) for sampling an analog video signal obtained by picking-up an object to be measured with a prescribed frequency and for converting respective video information for one image plane into a pixel data stream of m-rows and n-columns of digital pixel data; means (81, 82) for generating a clock signal in response to a synchronizing signal included in said analog video signal; first and second frame memory means (85a, 85b), each for storing said m-rows and n-columns of pixel data in an m-rows and n-columns manner; writing means (84) connected for receiving an output from said converting means and writing received pixel data in an interlace manner on every other line in said first and second frame memory means in response to said clock signal, said writing means writing pixel data into either one of said frame memory means alternately for every image plane; reading means (86) connected for reading pixel data successively in a noninterlace manner from said first and second frame memory means in response to said clock signal, said reading means reading pixel data from the other frame memory means when pixel data are written in one frame memory meanns and vice versa.

* * * * *